United States Patent
Suzuki et al.

(10) Patent No.: US 11,570,284 B2
(45) Date of Patent: Jan. 31, 2023

(54) COMMUNICATION DEVICE, COMMUNICATION SYSTEM, AND NON-TRANSITORY COMPUTER READABLE MEDIUM

(71) Applicant: FUJIFILM Business Innovation Corp., Tokyo (JP)

(72) Inventors: Tatsuo Suzuki, Kanagawa (JP); Koji Masuda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 145 days.

(21) Appl. No.: 16/543,627

(22) Filed: Aug. 19, 2019

(65) Prior Publication Data
US 2020/0304607 A1   Sep. 24, 2020

(30) Foreign Application Priority Data

Mar. 20, 2019 (JP) .............................. JP2019-053819

(51) Int. Cl.
*H04L 69/22* (2022.01)
*H04L 69/16* (2022.01)

(52) U.S. Cl.
CPC .............. *H04L 69/22* (2013.01); *H04L 69/16* (2013.01)

(58) Field of Classification Search
CPC ... H04L 63/101; H04L 63/108; H04L 63/123; H04L 67/104; H04L 69/16; H04L 69/22
See application file for complete search history.

(56) References Cited

U.S. PATENT DOCUMENTS

| | | | | |
|---|---|---|---|---|
| 7,069,432 | B1 * | 6/2006 | Tighe ................... | H04L 63/101 379/229 |
| 8,510,821 | B1 * | 8/2013 | Brandwine .......... | G06F 21/552 726/11 |
| 8,718,607 | B2 * | 5/2014 | Mohajeri .............. | H04W 76/11 455/411 |
| 10,972,507 | B2 * | 4/2021 | Šebesta ................ | G06F 21/566 |
| 2004/0174874 | A1 | 9/2004 | Saito et al. | |
| 2005/0125692 | A1 * | 6/2005 | Cox .................... | H04L 63/0272 726/4 |

(Continued)

FOREIGN PATENT DOCUMENTS

JP    2004-328706    11/2004

OTHER PUBLICATIONS

"Notice of Reason for Refusal of Japan Counterpart Application", dated Nov. 15, 2022, with English translation thereof, p. 1-p. 3

*Primary Examiner* — Khaled M Kassim
(74) *Attorney, Agent, or Firm* — JCIPRNET

(57) ABSTRACT

A communication device includes a transmission unit and a processing unit. The transmission unit transmits a packet group including multiple packets. In a case in which the communication device itself is not trusted by a destination communication device to which to transmit the packet group, the processing unit performs a process of instructing each of multiple nodes of a management unit that registers and manages management information distributed among the multiple nodes to register header information as the management information, the header information being partial information of a header included in each packet of the packet group transmitted by the transmission unit.

4 Claims, 14 Drawing Sheets

(56) References Cited

U.S. PATENT DOCUMENTS

| | | | |
|---|---|---|---|
| 2006/0029062 A1* | 2/2006 | Rao | H04L 63/164 370/389 |
| 2007/0204330 A1* | 8/2007 | Townsley | H04L 63/0892 726/4 |
| 2008/0313704 A1* | 12/2008 | Sivaprasad | H04L 51/12 726/2 |
| 2010/0042713 A1* | 2/2010 | Tanaka | H04L 47/783 709/223 |
| 2011/0289050 A1* | 11/2011 | McCarthy | G06F 16/27 707/617 |
| 2012/0066493 A1* | 3/2012 | Widergren | H04L 63/0428 713/160 |
| 2013/0165187 A1* | 6/2013 | Kusakabe | H04W 52/0209 455/574 |
| 2015/0007317 A1* | 1/2015 | Jain | H04L 63/0227 726/23 |
| 2015/0052597 A1* | 2/2015 | Anderson | H04L 63/08 726/9 |
| 2015/0106528 A1* | 4/2015 | Somes | H04L 67/02 709/228 |
| 2015/0317475 A1* | 11/2015 | Aguayo Gonzalez | G06F 21/55 726/23 |
| 2016/0006754 A1* | 1/2016 | Woodward | H04L 63/1408 726/23 |
| 2016/0014126 A1* | 1/2016 | Jalan | H04L 63/166 726/7 |
| 2017/0201850 A1* | 7/2017 | Raleigh | G06F 3/0482 |
| 2018/0270113 A1* | 9/2018 | Nainar | H04L 41/16 |
| 2018/0343238 A1* | 11/2018 | Tola | H04L 9/14 |
| 2019/0013967 A1* | 1/2019 | Ishii | H04L 63/0892 |
| 2019/0319905 A1* | 10/2019 | Baggett | H04L 51/12 |
| 2020/0274887 A1* | 8/2020 | Zaw | H04L 63/1441 |

* cited by examiner

FIG. 7

| BIT OFFSET | 0-3 | 4-7 | 8-15 | 16-31 |
|---|---|---|---|---|
| 0 | SOURCE IP ADDRESS | | | |
| 32 | DESTINATION IP ADDRESS | | | |
| 64 | ZERO | | PROTOCOL | PACKET LENGTH |
| 96 | SOURCE PORT | | | DESTINATION PORT |
| 128 | SEQUENCE NUMBER | | | |
| 160 | ACKNOWLEDGEMENT NUMBER | | | |
| 192 | HEADER LENGTH | RESERVED | FLAG GROUP | WINDOW SIZE |
| 224 | CHECKSUM | | | URGENT POINTER |
| 256 | OPTIONAL DATA (IF PRESENT) | | | |
| 256/288+ | DATA | | | |

COMMUNICATION DEVICE, COMMUNICATION SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-053819 filed Mar. 20, 2019.

BACKGROUND

(i) Technical Field

The present disclosure relates to a communication device, a communication system, and a non-transitory computer readable medium.

(ii) Related Art

Japanese Unexamined Patent Application Publication No. 2004-328706 discloses a transmission device provided with: a transmission control unit that controls the transmission of a packet including encrypted electronic data, copyright protection control data, and a real-time transport protocol (RPT) header containing a payload type value indicating information related to the encrypted electronic data; a negotiation unit that executes a negotiation with a reception device to decide the payload type value; and an authentication/key exchange processing unit that executes an authentication/key exchange process with the reception device for copyright protection.

SUMMARY

There exists technology that manages the same information distributed among multiple computation nodes in a computation node group, and determines whether or not the information has been falsified. With this technology, information stored by the majority of computation nodes in the computation node group is treated as "correct information". Also, information that is different from the correct information is determined to be "falsified information". The greater the number of computation nodes included in the computation node group, the more difficult it becomes to falsify information.

In communication by the TCP/IP protocol, information to be transmitted is transmitted by being broken up into multiple packets. Each of the multiple packets includes a header indicating the source, destination, and the like. There is a possibility of packets being falsified during communication. The information to be transmitted may be managed by being distributed among multiple computation nodes in a computation node group, and it may be determined whether or not the information has been falsified.

Aspects of non-limiting embodiments of the present disclosure relate to guaranteeing the trustworthiness of communication content in a communication method that depends on the trustworthiness of communication between a source communication device and a destination communication device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a communication device including a transmission unit and a processing unit. The transmission unit transmits a packet group including multiple packets. In a case in which the communication device itself is not trusted by a destination communication device to which to transmit the packet group, the processing unit performs a process of instructing each of multiple nodes of a management unit that registers and manages management information distributed among multiple nodes to register header information as the management information, the header information being partial information of a header included in each packet of the packet group transmitted by the transmission unit.

BRIEF DESCRIPTION OF THE DRAWINGS

An exemplary embodiment of the present disclosure will be described in detail based on the following figures, wherein:

FIG. 7 is a table illustrating one example of a TCP/IP header;

DETAILED DESCRIPTION

Hereinafter, an exemplary embodiment of the present disclosure will be described in detail and with reference to the drawings.

<Communication System>

First, the communication system will be described.

Figure 1:
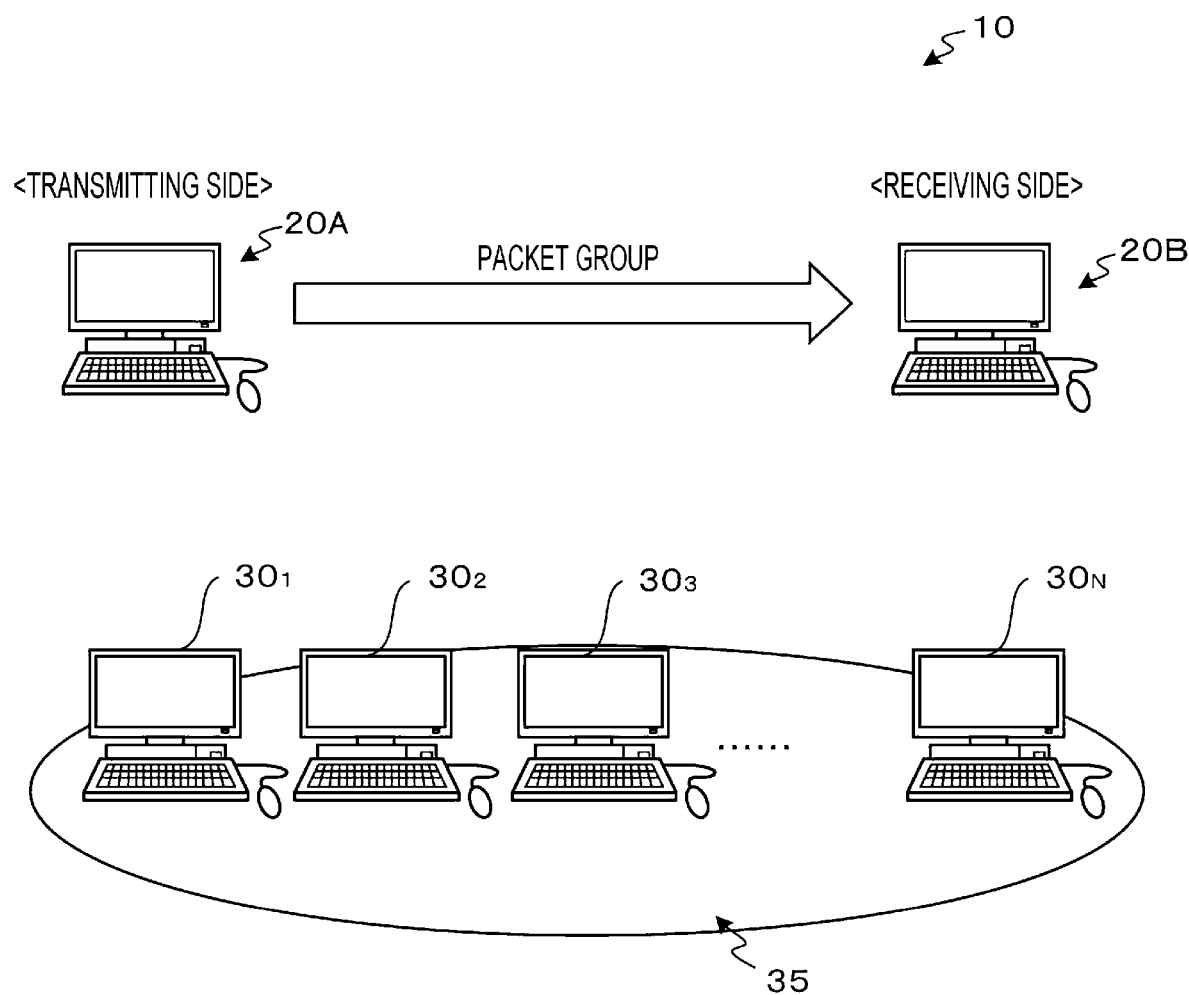
FIG. 1 is a schematic diagram illustrating one example of a configuration of a communication system according to an exemplary embodiment of the present disclosure.

FIG. 1 is a schematic diagram illustrating one example of a configuration of a communication system according to an exemplary embodiment of the present disclosure. A computation system 10 is provided with multiple communication devices 20 that communicate according to the TCP/IP protocol, and a computation node group 35. The computation node group 35 is provided with multiple computation nodes $30_1$ to $30_N$. A computation node is one example of a node.

In the exemplary embodiment, a pair of communication devices that communicate from among the multiple communication devices 20 will be described. The pair of communication devices are a source communication device 20A and a destination communication device 20B. The communication device 20A and the communication device 20B will be collectively referred to as the communication device 20 when not being individually distinguished.

Each of the multiple communication devices 20 is connected to another communication device via a communication line (not illustrated). Each of the multiple communication devices is connected to each of the multiple computation nodes $30_1$ to $30_N$ via a communication line (not illustrated). The multiple computation nodes $30_1$ to $30_N$ will be collectively referred to as the computation node 30 when not being individually distinguished.

As described later, each of the communication devices 20 and computation nodes 30 is a computer. Each computation node 30 of the computation node group 35 is a computer different from each of the communication device 20A and the communication device 20B.

The TCP/IP protocol is a protocol used when transferring data between computers. Before performing a data transfer, a connection is established between the communicating computers by specifying an IP address and a port number. Also, the data to transfer is broken up into multiple packets and transmitted, and the packets are reconstructed on the receiving side to restore the data.

(Communication Device)

Next, the configuration of the communication device 20 will be described. Each of the multiple communication devices 20 has the same configuration.

Figures 2, 3:
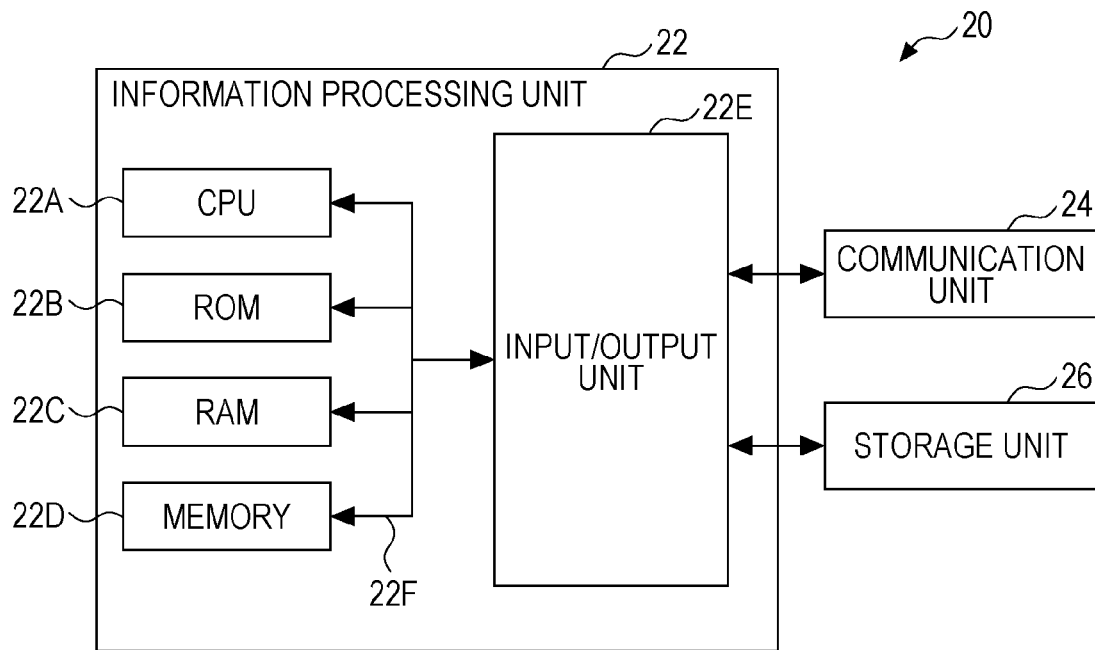
FIG. 2 is a block diagram illustrating one example of an electrical configuration of a communication device.
FIG. 3 is a table illustrating one example of a trust list stored in a communication device.

FIG. 2 is a block diagram illustrating one example of an electrical configuration of the communication device. The communication device 20 is provided with an information processing unit 22, which is a computer that controls the device as a whole and performs various computations. The information processing unit 22 is provided with a CPU 22A, ROM 22B that stores various programs, RAM 22C used as a work area when executing programs, non-volatile memory 22D, and an input/output unit 22E. The CPU 22A, the ROM 22B, the RAM 22C, the memory 22D, and the input/output unit 22E are interconnected via a bus 22F.

The communication device 20 is provided with a communication unit 24 and a storage unit 26. The communication unit 24 is a communication interface for communicating with an external device. The storage unit 26 is an external storage device such as a hard disk. Each of the communication unit 24 and the storage unit 26 is connected to the input/output unit 22E. The information processing unit 22 causes information to be exchanged among the units and controls each unit.

Note that some or all of the multiple communication devices 20 may also be provided with an input unit such as a keyboard and mouse as well as a display unit such as a display as an interface for a user of the communication device. Each of the input unit and the display unit is controlled by the information processing unit 22.

In the exemplary embodiment, control programs for a "transmission process" and a "reception process" described later are stored in the ROM 22B of the communication device 20. Also, a trust list (see FIG. 3) is stored in the storage unit 26 of the communication device 20.

FIG. 3 is a table illustrating one example of the trust list stored in the communication device. A trust list 28 is a list recording trust information indicating one or more peer communication devices that the device itself trusts. The trust information is information associating a source IP address, a port, and a period of validity. The source IP address is the IP address of a source communication device that the device itself trusts. The port is a port number of the device itself. The period of validity is the final valid date and time of the trust information.

Assume that the device itself acting as the destination is a communication device B. In the illustrated example, in the trust list held by the communication device B, there exists trust information indicating that "the destination communication device B trusts the source communication device A regarding communication on port 22 of the communication device B until 12/31/2018 23:59:59".

Note that various programs and various data may also be stored in another storage device internal or external to the device, and may also be recorded onto a recording medium such as CD-ROM. Also, various programs and various data may be acquired through communication.

(Computation Node)

Next, a configuration of the computation node 30 will be described. Each of the multiple computation nodes 30 has the same configuration.

Figure 4:
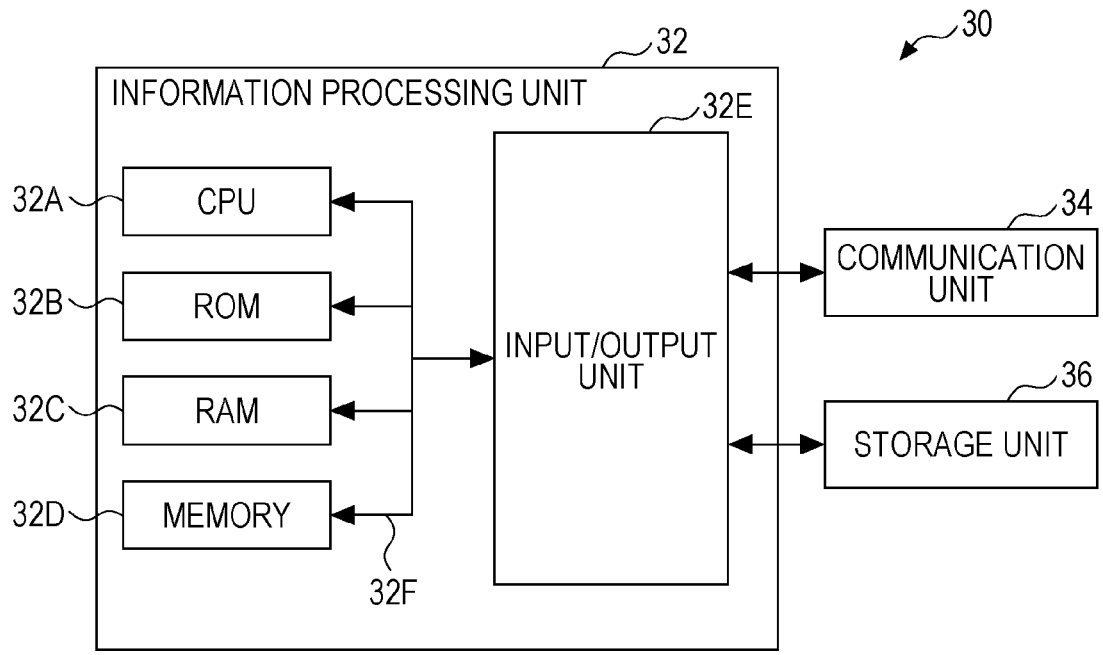
FIG. 4 is a block diagram illustrating one example of an electrical configuration of a computation node.

FIG. 4 is a block diagram illustrating one example of an electrical configuration of the computation node. The computation node 30 is provided with an information processing unit 32, which is a computer that controls the device as a whole and performs various computations. The information processing unit 32 is provided with a CPU 32A, ROM 32B that stores various programs, RAM 32C used as a work area when executing programs, non-volatile memory 32D, and an input/output unit 32E. The CPU 32A, the ROM 32B, the RAM 32C, the memory 32D, and the input/output unit 32E are interconnected via a bus 32F.

The computation node 30 is provided with a communication unit 34 and a storage unit 36. The communication unit 34 is a communication interface for communicating with an external device. The storage unit 36 is an external storage device such as a hard disk. Each of the communication unit 34 and the storage unit 36 is connected to the input/output unit 32E. The information processing unit 32 causes information to be exchanged among the units and controls each unit.

Note that some or all of the multiple computation nodes 30 may also be provided with an input unit such as a keyboard and mouse as well as a display unit such as a display as an interface for a user of the computation node. Each of the input unit and the display unit is controlled by the information processing unit 32.

In the exemplary embodiment, a trust list group and header information is stored in the storage unit 36 of the computation node 30. The trust list group and the header information is managed by being distributed to each of the multiple computation nodes 30 in the computation node group 35. The computation node group 35 is one example of a "management unit", and each computation node manages the header information as "management information".

Figure 5:
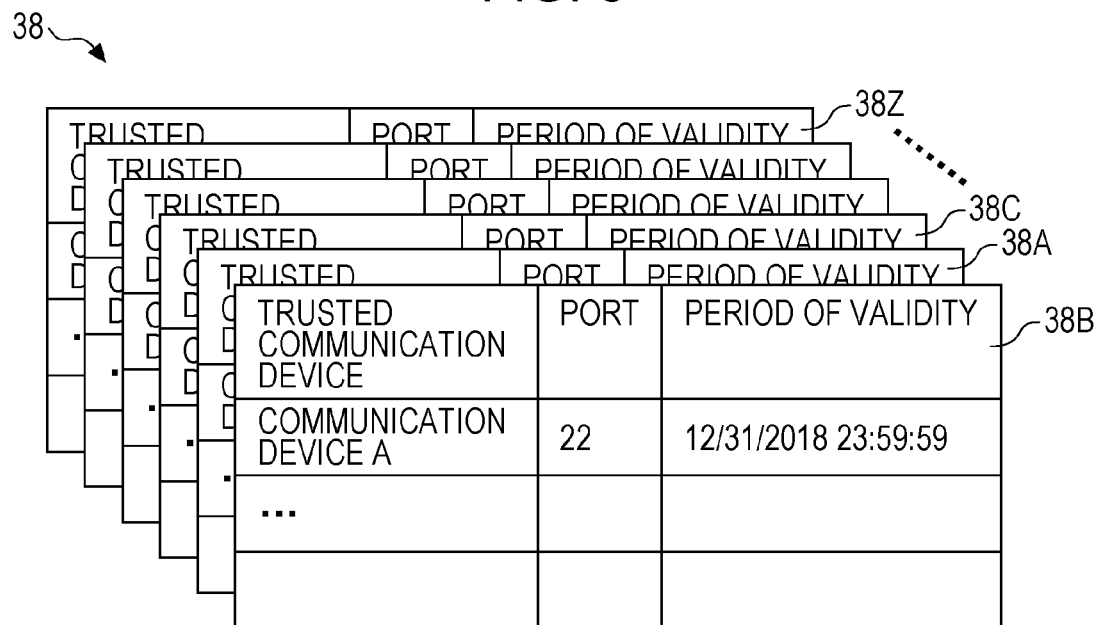
FIG. 5 is a table illustrating one example of a trust list group stored in a computation node.

FIG. 5 is a table illustrating one example of the trust list group stored in the computation node. A trust list group 38 is the set of trust lists of each of the multiple communication devices 20. Each of the multiple communication devices 20 registers and updates its own trust list in the computation node 30. For example, assume that the multiple communication devices 20 are a communication device A, a communication device B, and so on to a communication device Z. The trust list group 38 includes a trust list 38A of the communication device A, a trust list 38B of the communication device B, and so on to a trust list 38Z of the communication device Z.

Figure 6:
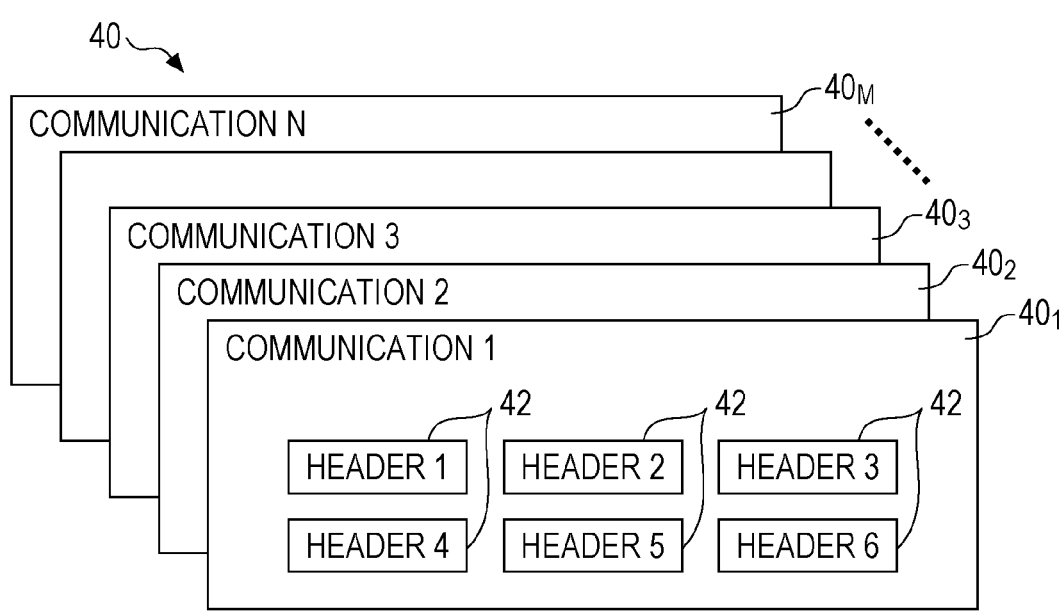
FIG. 6 is a table illustrating one example of header information stored in a computation node.

FIG. 6 is a table illustrating one example of header information stored in the computation node. Header information 40 is registered by the communication device for every "communication using the computation node group" described later, and is managed by being distributed to each computation node. For example, assume that header information for M communication sessions is stored. The header information 40 includes Communication 1 header information $40_1$, Communication 2 header information $40_2$, and so on to Communication M header information $40_M$.

Each packet in a packet group transmitted in one communication session contains a header. FIG. 7 is a table illustrating one example of a TCP/IP header.

The TCP/IP header includes a source port, a destination port, a sequence number, an acknowledgment number, a header length, a reserved portion, a flag group, a window size, a checksum, an urgent pointer, and options as a TCP header. The options are optional items. The TCP/IP header includes a source IP address, a destination IP address, zero, a protocol, and a packet length as an IP header.

In the "communication using the computation node group" described later, partial information in the header is registered in the computation node 30. Compared to the case of treating all of the information in the header as the header information, the computational load on each computation node is reduced. In the exemplary embodiment, the source IP address, the destination IP address, the source port, the destination port, the sequence number, and the checksum are registered in the computation node 30 as the header information. The checksum is a value used to error-check the TCP header and the data portion.

In the following, the communication device 20A in FIG. 1 will be referred to as the "source communication device A" or the "communication device A". Also, the communication device 20B in FIG. 1 will be referred to as the "destination communication device B" or the "communication device B".

<Transmission Process>

Next, the transmission process will be described.

First, the transmission process that transmits a packet group from the source communication device A to the destination communication device B will be described.

Figure 8:
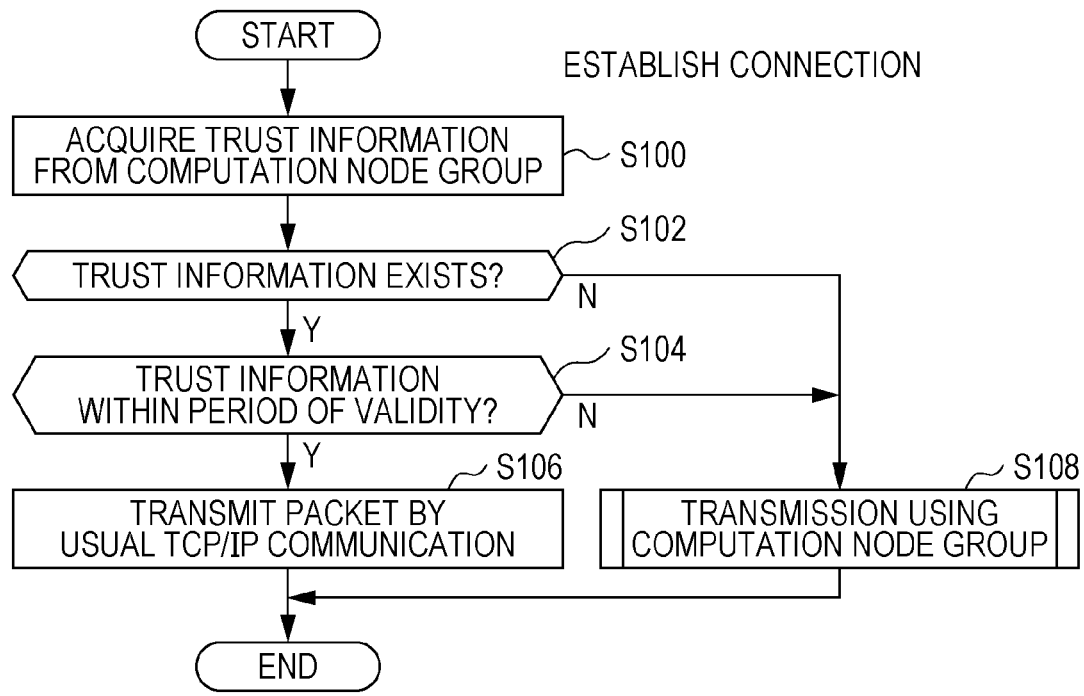
FIG. 8 is a flowchart illustrating one example of the flow of a transmission process according to an exemplary embodiment of the present disclosure.

FIG. 8 is a flowchart illustrating one example of the flow of the transmission process according to the exemplary embodiment of the present disclosure. A control program for executing the transmission process is read out from the ROM and executed by the CPU of the communication device A on the transmitting side. Hereinafter, for the sake of convenience, the communication device A will be described as the agent of the processing operations.

The control program of the transmission process is started when the establishment of a connection between the source communication device A and the destination communication device B is requested.

First, in step 100, the source communication device A acquires trust information of the communication device B toward the communication device A from each computation node in the computation node group.

The trust information of the communication device B toward the communication device A is information indicating that the communication device B trusts the source communication device A until the period of validity expires. The trust information of the communication device B toward the communication device A is information associating the IP address of the communication device A (source IP address), the connection port of the communication device B (destination port number), and the period of validity.

Figure 10:
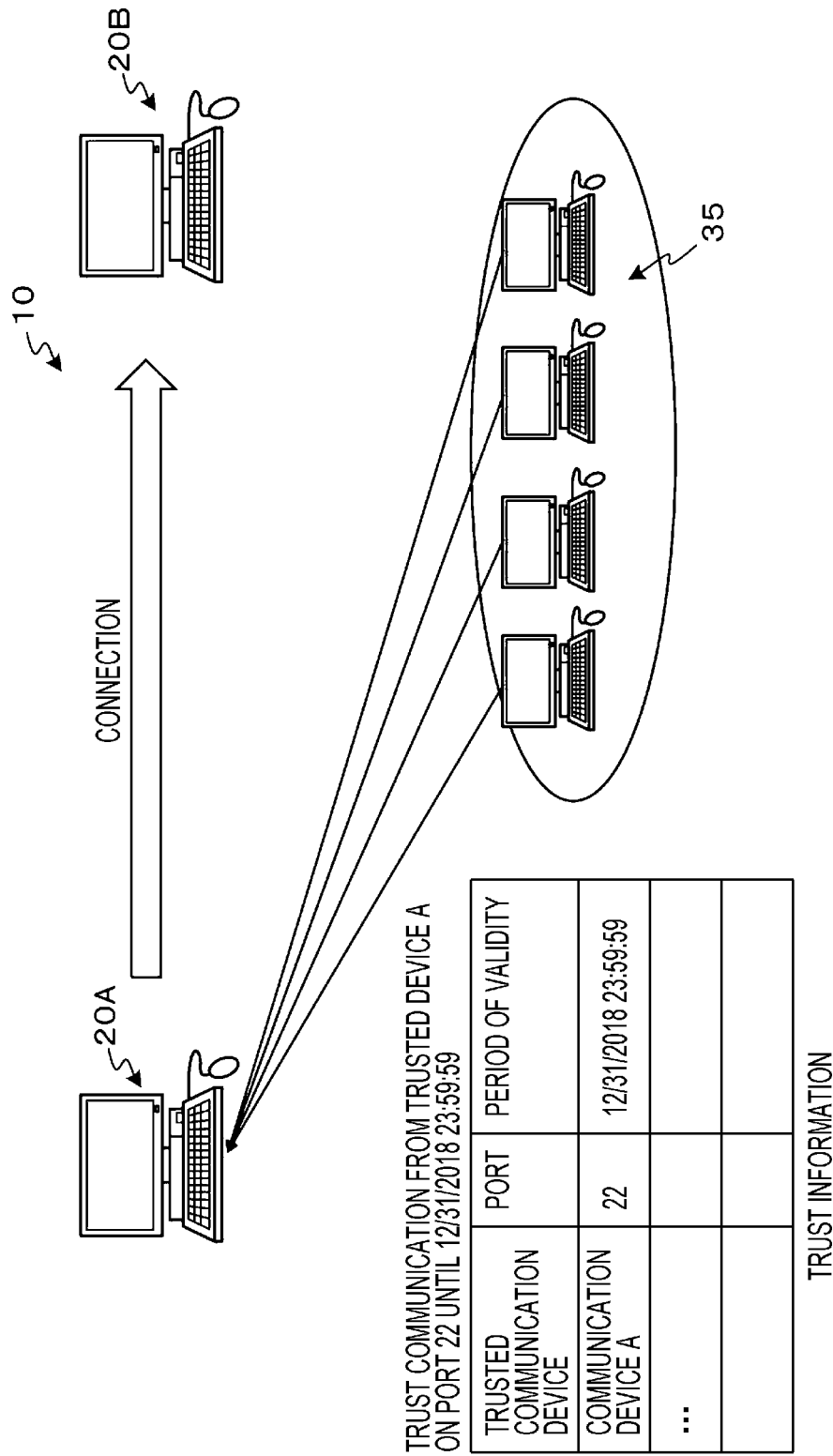
FIG. 10 is a schematic diagram illustrating one example of a step of acquiring trust information from a computation node group.

FIG. 10 is a schematic diagram illustrating one example of the step of acquiring trust information from the computation node group. As illustrated in FIG. 10, in the exemplary embodiment, the trust list corresponding to each of the multiple communication devices is managed by being distributed to each computation node in the computation node group 35. As described later, the trust list of each communication device held by each computation node is registered and updated by the corresponding communication device.

The source communication device A requests each computation node in the computation node group 35 to transmit the trust information of the communication device B toward the communication device A. The computation node holding the requested trust information transmits the trust information to the communication device A in response to the request.

Next, in step 102, it is determined whether or not the trust information of the communication device B toward the communication device A exists in a majority (more than half) of the computation nodes in the computation node group. In the case in which the trust information exists in a majority (more than half) of the computation nodes, the flow proceeds to step 104. In the case in which the trust information does not exist in a majority (more than half) of the computation nodes, the flow proceeds to step 108.

Next, in step 104, it is determined whether or not the trust information of the communication device B toward the communication device A is within the period of validity in a majority (more than half) of the computation nodes in the computation node group. In the case in which the transmission timing of transmitting the packet group is not later than the final valid date and time included in the trust information, the trust information is within the period of validity.

In the case in which non-expired trust information is acquired from a majority (more than half) of the computation nodes in the computation node group, it is determined that normal communication may be performed, and the flow proceeds to step 106. In step 106, the communication device A transmits the packet group to the communication device B without using the computation node group, and ends the routine. In other words, the communication device A performs TCP/IP communication as usual.

On the other hand, in step 104, in the case in which the trust information is expired in a majority (more than half) of the computation nodes, the flow proceeds to step 108. In other words, in the case in which the trust information is not acquired from a majority (more than half) of the computation nodes and in the case in which expired trust information is acquired from a majority (more than half) of the computation nodes, it is determined that normal communication may not be performed, and the flow proceeds to step 108. In step 108, the communication device A performs a "transmission process using the computation node group" described later, and ends the routine.

(Transmission Process Using Computation Node Group)

Figure 9:
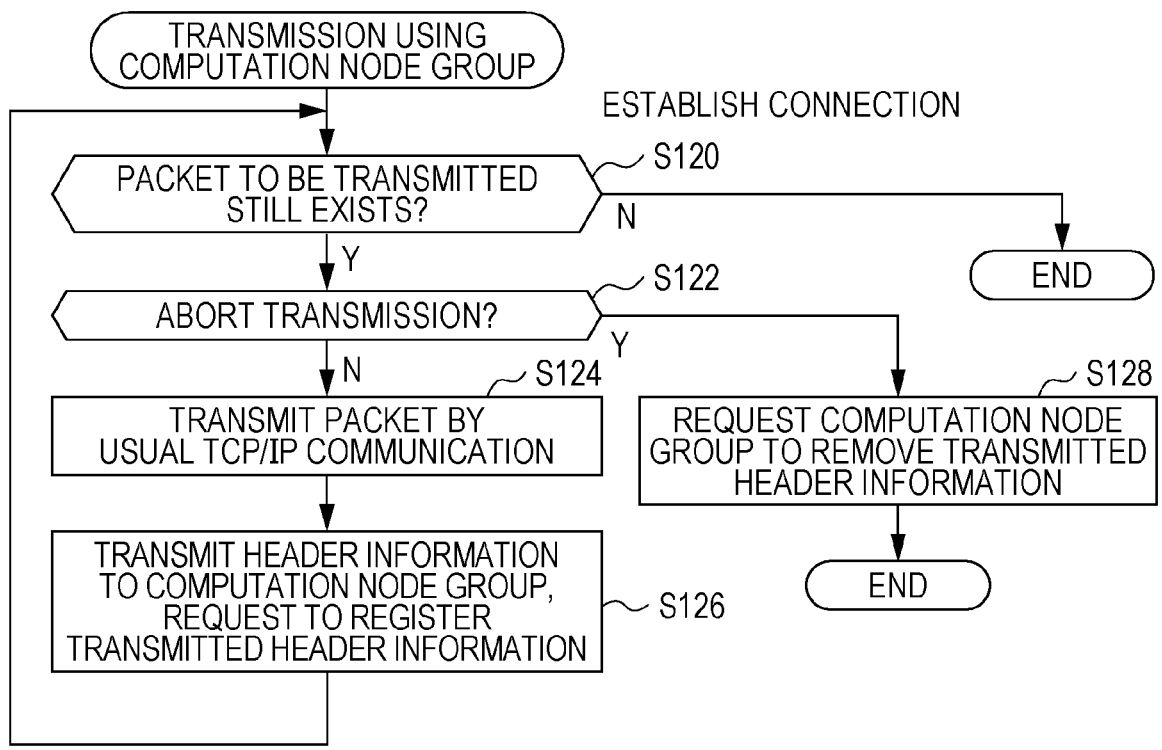
FIG. 9 is a flowchart illustrating one example of the flow of a transmission process using a computation node group.

Herein, the "transmission process using the computation node group" will be described. FIG. 9 is a flowchart illustrating one example of the flow of the transmission process using the computation node group.

First, in step 120, the communication device A determines whether or not a packet to be transmitted still exists, and if so, the flow proceeds to step 122.

Next, in step 122, the communication device A determines whether or not to abort transmission. In the case of not aborting transmission, the flow proceeds to step 124. In step 124, the source communication device A transmits the packet group to the communication device B by usual TCP/IP communication.

Next, in step 126, the communication device A transmits header information by encrypted communication, such as HTTPS communication for example, to each computation node in the computation node group, requests the registration of the header information, and returns to step 120.

Figure 11:
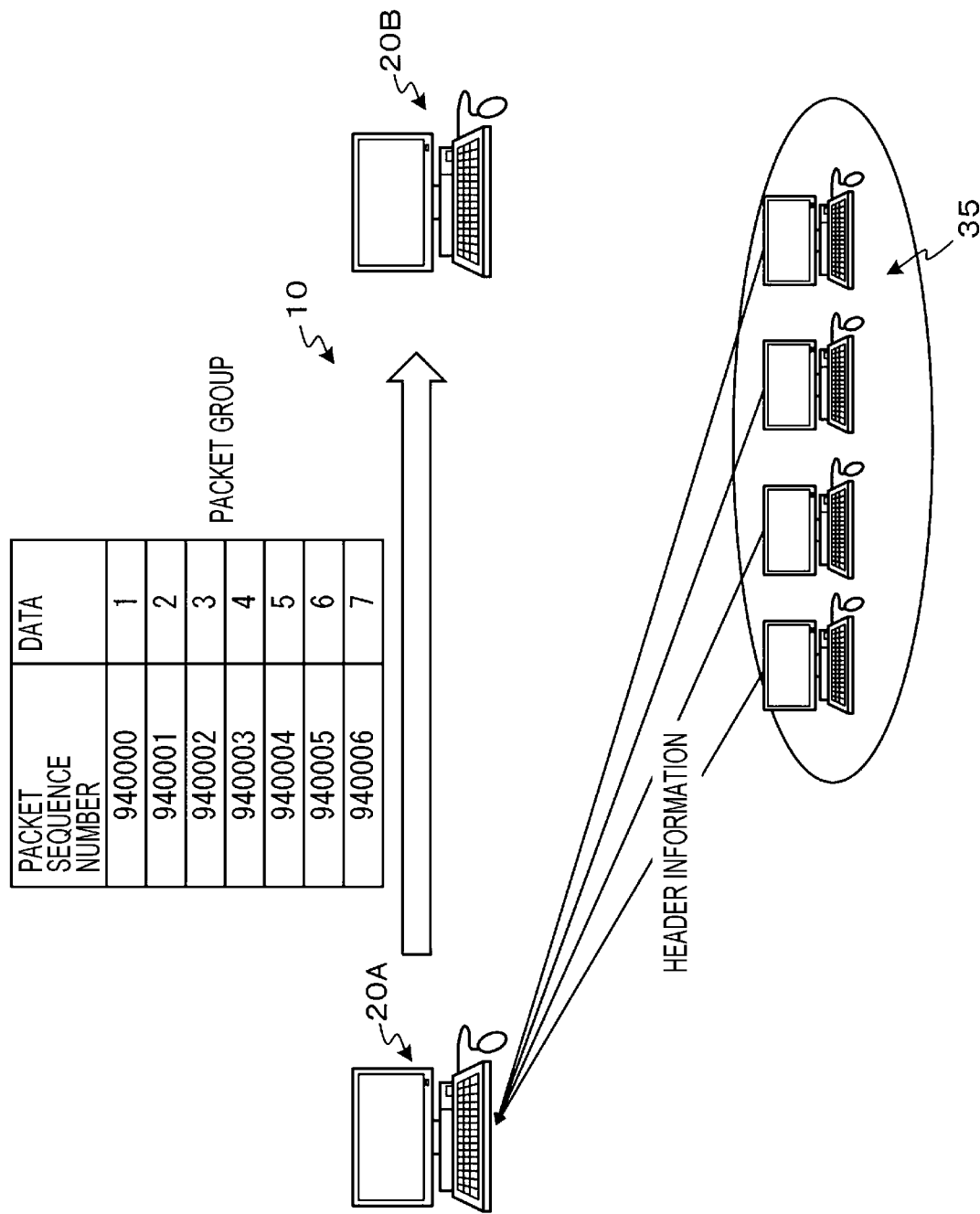
FIG. 11 is a schematic diagram illustrating one example of a step of transmitting header information to a computation node group.

FIG. 11 is a schematic diagram illustrating one example of the step of transmitting the header information to the computation node group. As illustrated in FIG. 11, the source communication device A transmits a packet group to the communication device B. Also, in the exemplary embodiment, the source communication device A requests each computation node in the computation node group 35 to register header information. Each computation node registers and manages the header information.

Usual TCP/IP communication is performed until a packet to be transmitted no longer exists in step 120, or in other words, until it is determined that all packets in the packet group have been transmitted. In the case in which all packets in the packet group have been transmitted, the routine ends.

In the case of aborting transmission in step 122, or in other words, in the case of stopping the transmission of the packet group to the communication device B partway through, the flow proceeds to step 128. In step 128, the communication device A issues a removal request requesting each computation node in the computation node group to remove the header information for the transmitted packets, and ends the routine. By this removal request, the header information of the packets that have been transmitted already are removed from each computation node.

<Reception Process>

Next, the reception process will be described.

Next, the reception process by the destination communication device B that receives the packet group transmitted from the source communication device A will be described.

Figure 12:
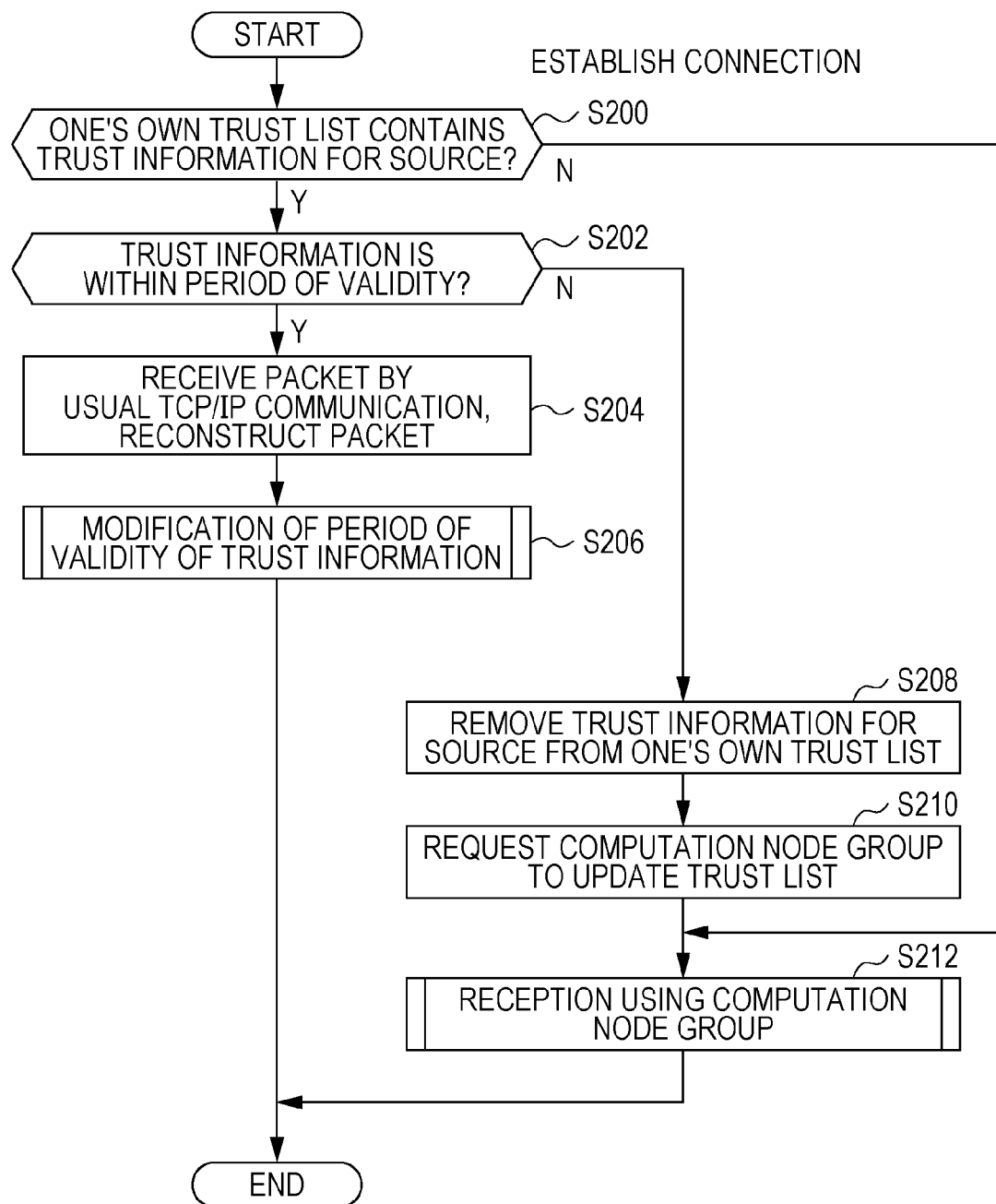
FIG. 12 is a flowchart illustrating one example of the flow of a reception process according to an exemplary embodiment of the present disclosure.

FIG. 12 is a flowchart illustrating one example of the flow of the reception process according to the exemplary embodiment of the present disclosure. A control program for executing the reception process is read out from the ROM and executed by the CPU of the communication device B on the receiving side. Hereinafter, for the sake of convenience, the communication device B will be described as the agent of the processing operations.

The control program of the reception process is started when a connection is established between the source communication device A and the destination communication device B.

First, in step 200, the destination communication device B determines whether or not trust information toward the source communication device A exists in the trust list stored in the storage unit of the communication device B itself (hereinafter referred to as "one's own trust list").

As above, the trust information of the communication device B toward the communication device A is information associating the IP address of the communication device A (source IP address), the connection port of the communication device B (destination port number), and the period of validity. The communication device B trusts the source communication device A until the period of validity of the trust information expires.

In the case in which one's own trust information toward the communication device A exists in one's own trust list, the flow proceeds to step 202. In the case in which one's own trust information toward the communication device A does not exist in one's own trust list, the flow proceeds to step 212.

Next, in step 202, the communication device B determines whether or not one's own trust information toward the communication device A is within the period of validity. In the case in which the trust information is within the period of validity, the source communication device A is determined to be a trustworthy communication device, and the flow proceeds to step 204.

Next, in step 204, the communication device B receives the packet group by usual TCP/IP communication and reconstructs the packets using the header contained in each packet of the received packet group.

Next, in step 206, the communication device B performs a "process of modifying the period of validity of the trust information" described later, and ends the routine. For example, in the case of trusting the source communication device A, the period of validity of the trust information of the communication device B toward the communication device A is extended.

On the other hand, in step 202, in the case in which the trust information is expired, it is determined that trusting the source communication device A may not be continued, and the flow proceeds to step 208.

Next, in step 208, the communication device B removes the expired trust information from one's own trust list. Next, in step 210, the communication device B issues an update request requesting each computation node in the computation node group to update the trust list held by the computation node to remove the trust information of the communication device B toward the communication device A, and ends the routine. Each computation node removes the expired trust information from the trust list of the computation node in response to the update request.

Next, in step 212, the communication device B performs a "reception process using the computation node group" described later, and ends the routine. In other words, in the case in which one's own trust information toward the communication device A does not exist and in the case in which one's own trust information toward the communication device A is expired, the "reception process using the computation node group" described later is performed.

(Reception Process Using Computation Node Group)

Figure 13:
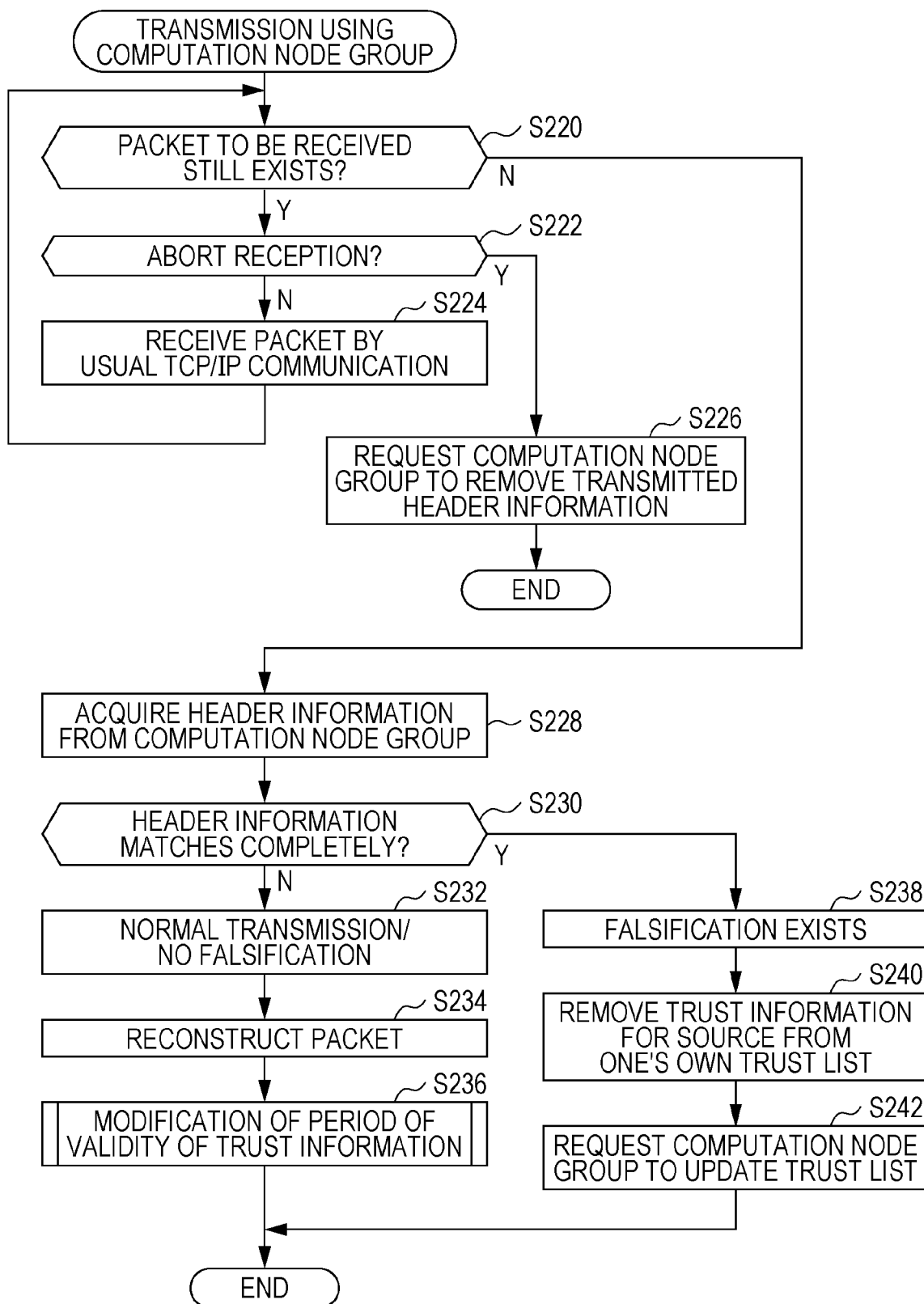
FIG. 13 is a flowchart illustrating one example of the flow of a reception process using a computation node group.

Herein, the "reception process using the computation node group" will be described. FIG. 13 is a flowchart illustrating one example of the flow of the reception process using the computation node group.

First, in step 220, the communication device B determines whether or not a packet to be received still exists, and if so, the flow proceeds to step 222.

Next, in step 222, the communication device B determines whether or not to abort reception. In the case of not aborting reception, the flow proceeds to step 224. In step 224, the communication device B receives the packet by usual TCP/IP communication, and returns to step 220.

On the other hand, in the case of aborting reception in step 222, or in other words, in the case in which the communication device B stops the reception of the packet group partway through, the flow proceeds to step 226. In step 226, the communication device B issues a removal request requesting each computation node in the computation node group to remove the header information for the received packets, and ends the routine. By this removal request, the header information of the packets that have been received already are removed from the computation node group.

TCP/IP communication is performed until a packet to be received no longer exists in step 220, or in other words, until it is determined that all packets in the packet group have been received. In the case in which all packets in the packet group have been received, the flow proceeds to step 228.

Next, in step 228, the communication device B acquires the header information of each packet in the received packet group from each computation node in the computation node group by encrypted communication, such as HTTPS communication, for example.

Next, in step 230, the communication device B determines whether or not the header information of each packet in the received packet group and the "correct header information" of each packet acquired from the computation node group match completely. In the case of a complete match, the flow proceeds to step 232. In step 232, the communication device B determines that the packets have not been falsified. In other words, the communication device B determines that normal communication from the trustworthy communication device A has been performed.

The header information is stored in each computation node of the computation node group. Herein, the header information held by the majority (more than half) of the computation nodes in the computation node group is treated as the "correct header information". In the exemplary embodiment, for each packet in the received packet group, each of the source IP address, the destination IP address, the source port, the destination port, the sequence number, and the checksum fields contained in the header of each packet is cross-checked against the corresponding field in the correct header information.

Figure 15:
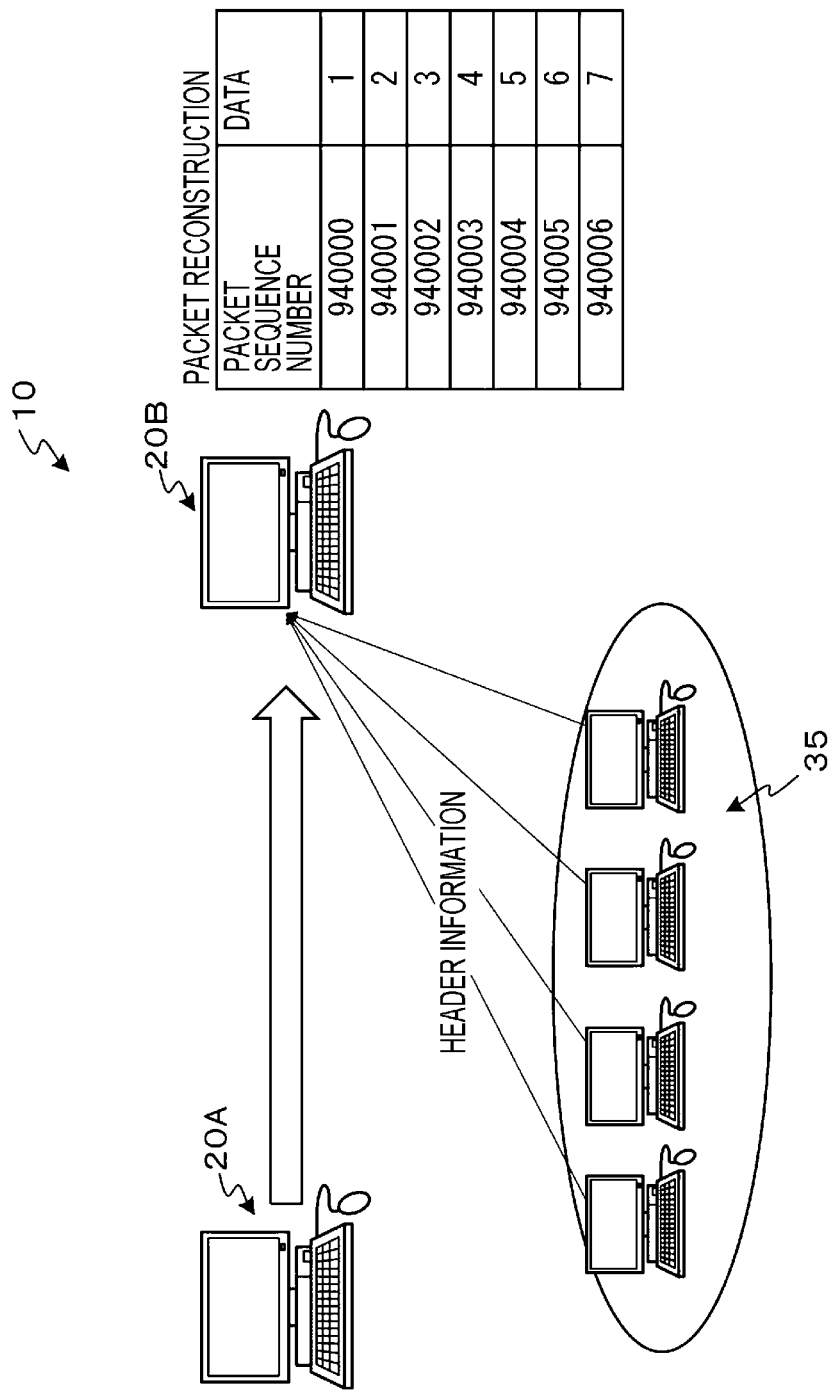
FIG. 15 is a schematic diagram illustrating one example of a step of acquiring header information from a computation node group.

Next, in step 234, the communication device B reconstructs the packets in accordance with the sequence number of the header information contained in each packet in the received packet group. FIG. 15 is a schematic diagram illustrating one example of the step of acquiring the header information from the computation node group. The communication device B acquires the header information from each computation node in the computation node group 35.

In the case in which the header information of each packet in the received packet group matches the correct header information acquired from the computation node group 35, the communication device B reconstructs the packets according to the sequence numbers. In the illustrated example, the data to transfer is transmitted by being broken up into seven packets. Each packet is assigned a sequence number (940000 to 940006) in association with the arrangement order of the data. The communication device B reconstructs the packets according to the sequence numbers to restore the transferred data.

Next, in step 236, the communication device B performs the "process of modifying the period of validity of the trust information" described later, and ends the routine. For example, in the case in which normal communication is performed between the communication device A and the communication device B for the first time, the communication device B newly registers trust information of the communication device B toward the communication device A in one's own trust list and the trust list of the computation node group.

On the other hand, in the case in which the header information does not match completely in step 230, the flow proceeds to step 238. In step 238, it is determined that the packets have been falsified. In other words, it is determined that there is a possibility that data has been falsified, such as that at least one of the packet headers and the data contained in the packets has been rewritten along the way.

In the case in which the packets have been falsified, it is determined that trusting the source communication device A may not be continued. In the next step 240, the communication device B removes one's own trust information toward the communication device A from one's own trust list.

Next, in step 242, the communication device B issues an update request requesting each computation node in the computation node group to update the trust list to remove the trust information of the communication device B toward the communication device A, and ends the routine. Each computation node removes the trust information of the communication device B toward the communication device A from the trust list of the computation node in response to the update request.

(Process of Modifying Period of Validity of Trust Information)

Herein, the process of modifying the period of validity of the trust information will be described.

Figure 14:
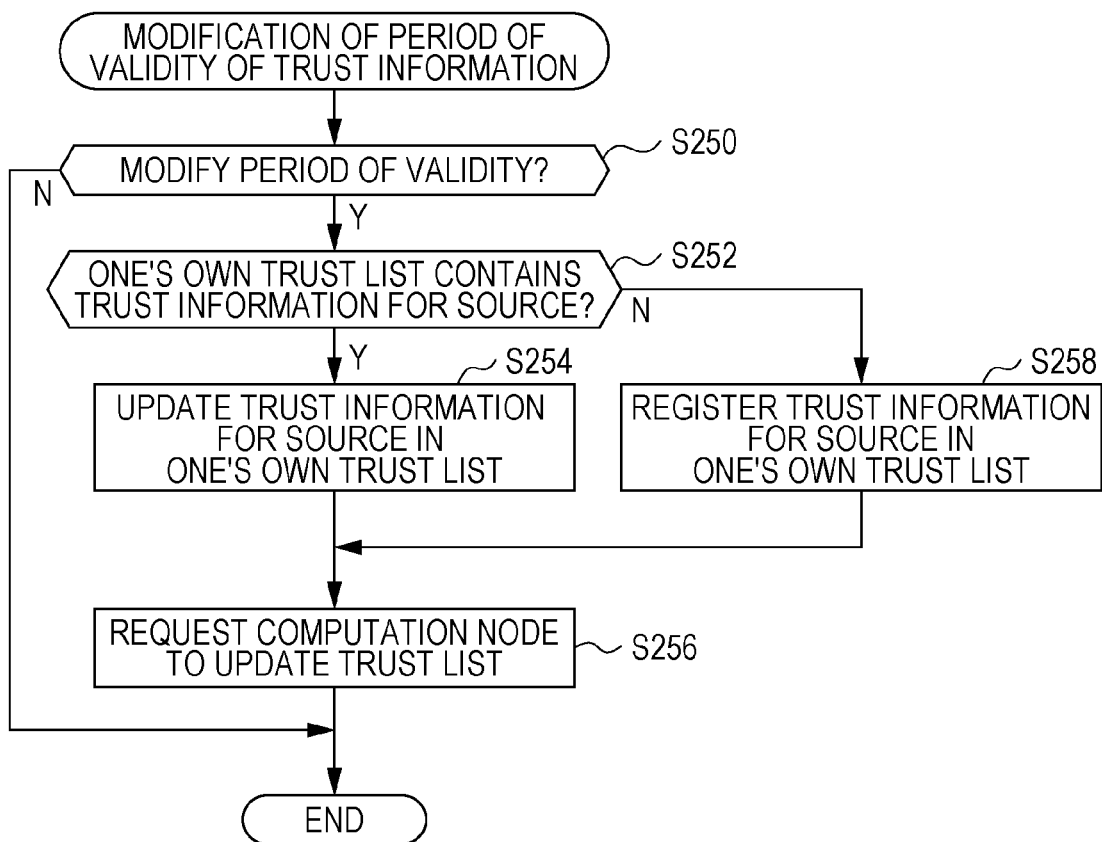
FIG. 14 is a flowchart illustrating one example of the flow of a process of modifying the period of validity of trust information.

FIG. 14 is a flowchart illustrating one example of the flow of the process of modifying the period of validity of the trust information. The process of modifying the period of validity includes both extending the period of validity of trust information that is already registered and registering the period of validity of trust information that is not registered.

In the exemplary embodiment, a condition on registering or extending the period of validity is preset for every communication device by a user of the communication device. The condition on registering or extending the period of validity may be decided in any way by the user. Each of the multiple communication devices registers or extends the period of validity in accordance with the set condition.

First, in step 250, the communication device B determines whether or not to modify the period of validity of the trust information. In the case of not modifying the period of validity, or in other words, in the case of neither extending the period of validity of trust information that is already registered nor registering the period of validity of trust information that is not registered, the routine ends. In the case of modifying the period of validity, the flow proceeds to step 252.

Next, in step 252, the communication device B determines whether or not trust information toward the communication device A with which normal communication has been performed exists in one's own trust list. In the case in which the trust information exists in one's own trust list, the flow proceeds to step 254. In step 254, the communication device B extends the period of validity of the trust information toward the communication device A in one's own trust list.

On the other hand, in step 252, in the case in which trust information toward the communication device A with which normal communication has been performed does not exist in one's own trust list, the flow proceeds to step 258. In step 258, the communication device B newly registers one's own trust information toward the communication device A with an attached period of validity in one's own trust list. The IP address of the communication device A (source IP address)

with which normal communication has been performed and the connection port of the communication device B (destination port number) are registered in one's own trust list together with the period of validity.

In the case of extending the period of validity of trust information that is already registered and in the case of newly registering the period of validity of trust information that is not registered in one's own trust list, the flow proceeds to step 256.

Next, in step 256, the communication device B issues an update request requesting each computation node in the computation node group to update the trust list of each computation node, and ends the routine. The communication device B requests each computation node in the computation node group to update the trust list of each computation node such that the period of validity of the trust information toward the communication device A becomes the same as the content in one's own trust list.

In the case in which the period of validity of trust information is extended in the trust list of the communication device B, each computation node extends the period of validity of the trust information of the communication device B toward the communication device A included in the trust list of the communication device B held by the computation node in response to the update request.

Also, in the case in which new trust information is registered in the trust list of the communication device B, each computation node adds and registers trust information of the communication device B toward the communication device A (including a period of validity) to the trust list of the communication device B held by the computation node in response to the update request.

As above, in the exemplary embodiment, the communication device A transmits a packet group to the communication device B by TCP/IP communication. The communication device B determines whether or not valid trust information toward the source communication device A exists, on the basis of the trust list held by the communication device B itself.

In the case in which valid trust information of the communication device B toward the communication device A does not exist, the communication device B performs communication using the computation node group. In the communication using the computation node group, the communication device A registers header information corresponding to the transmitted packet group in each computation node of the computation node group. The header information is managed by being distributed to each computation node in the computation node group, and falsification is difficult.

The communication device B receives the packet group from the communication device A, and in addition, acquires the header information corresponding to the received packet group from the computation node group. The communication device B cross-checks the header information of the received packet group against the "correct header information" acquired from the computation node group, and investigates whether data has been falsified in the received packet group. It is possible to perform communication safely even in cases where the source communication device is not trusted.

When transferring data between computers, by providing a mechanism to detect falsification of the transferred data, falsification of the transferred data is deterred. In the case of TCP/IP communication, data is transmitted by attaching a header to each data part. It is possible to perform communication using the computation node group irrespectively of the protocol (such as FTP or HTTP, for example) in the higher application layer.

In the case in which communication with the communication device A is performed normally, trust information toward the communication device A is registered in the trust list of the communication device B itself and the trust lists of the computation nodes. In the case in which trust information toward the communication device A already exists, the period of validity of the trust information toward the communication device A is extended. In the case in which data is falsified in communication with the communication device A, the trust information toward the communication device A is removed from the trust list of the communication device B itself and the trust lists of the computation nodes.

On the other hand, in the case in which valid trust information of the communication device B toward the communication device A exists, the communication device B trusts the source communication device A and performs TCP/IP communication without using the computation node group. By trusting the source communication device and performing "communication that does not use the computation node group", the computational load on the computation node group is greatly reduced.

<Exemplary Modifications>

Note that the configurations of the information processing device, program, and information processing system described in the foregoing exemplary embodiment are examples, and obviously these configurations may also be modified within a scope that does not depart from the gist of the present disclosure.

The foregoing exemplary embodiment describes a case of realizing the transmission process and the reception process by software, but equivalent processes may also be realized by hardware.

(Communication Via NAT)

Figure 16:
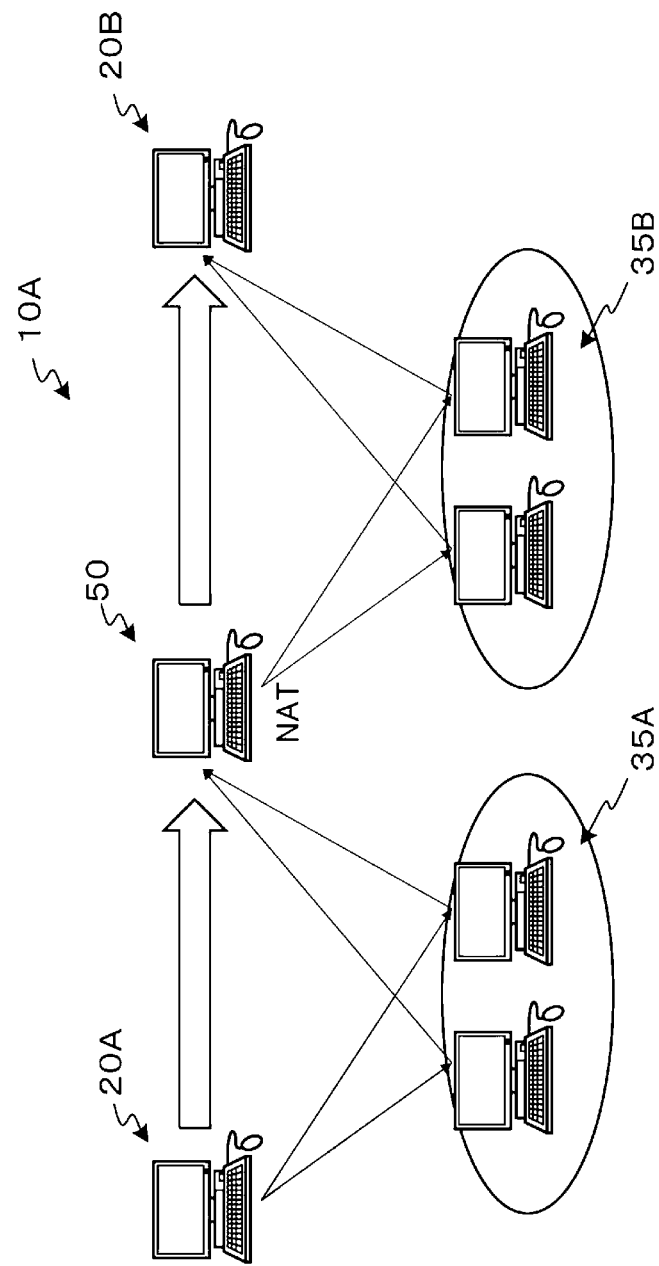
FIG. 16 is a schematic diagram illustrating an exemplary modification of the configuration of the communication system.

FIG. 16 is a schematic diagram illustrating an exemplary modification of the configuration of the communication system. A computation system 10A illustrated in FIG. 16 is provided with multiple communication devices 20, computation node groups 35, and a relay 50. The relay 50 is a piece of equipment such as a computer provided with a function of rewriting the source IP address and the destination IP address contained in the header, such as network address translation (NAT).

In the communication system illustrated in FIG. 16, the communication device A transmits a packet group to the communication device B via the relay 50. In the communication from the communication device A to the relay 50, the relay 50 becomes the destination. The relay 50 determines whether or not the source communication device A is trustworthy, on the basis of a trust list held by the relay 50 itself. In the case in which the communication device A is trustworthy, communication that does not use a computation node group 35A is performed. In the case in which the communication device A is not trustworthy, communication using the computation node group 35A is performed.

In the communication from the relay 50 to the communication device B, the relay 50 becomes the source. The communication device B determines whether or not the source relay 50 is trustworthy, on the basis of the trust list held by the communication device B itself. In the case in which the relay 50 is trustworthy, communication that does not use a computation node group 35B is performed. In the case in which the relay 50 is not trustworthy, communication using the computation node group 35B is performed.

Note that although the computation node group 35A and the computation node group 35b are illustrated separately, the multiple computation nodes included in the computation node group 35a and the multiple computation nodes included in the computation node group 35B may be the same or overlap each other.

(Stopping Computer) Also, the foregoing exemplary embodiment describes an example of removing expired trust information from each computation node, an example of removing trust information toward an untrustworthy source from each computation node, and an example of removing header information from each computation node in the case of aborting communication, but the timings at which to remove information from each computation node in the computation node group are not limited to the above.

For example, in the case in which the computer in each of the multiple communication devices stops, a request to reset the information registered in relation to the communication device itself is issued to each computation node in the computation node group. Through the reset request, the trust information and header information registered in relation to the communication device itself is removed from each computation node in the computation node group.

(Blockchain)

Also, in the foregoing exemplary embodiment, the information held by the majority (more than half) of the computation nodes in the computation node group is treated as the "correct information", but the trust information and the header information may also be stored in a blockchain that is difficult to falsify. In this case, the information stored in the blockchain is treated as the "correct information".

Figure 17:
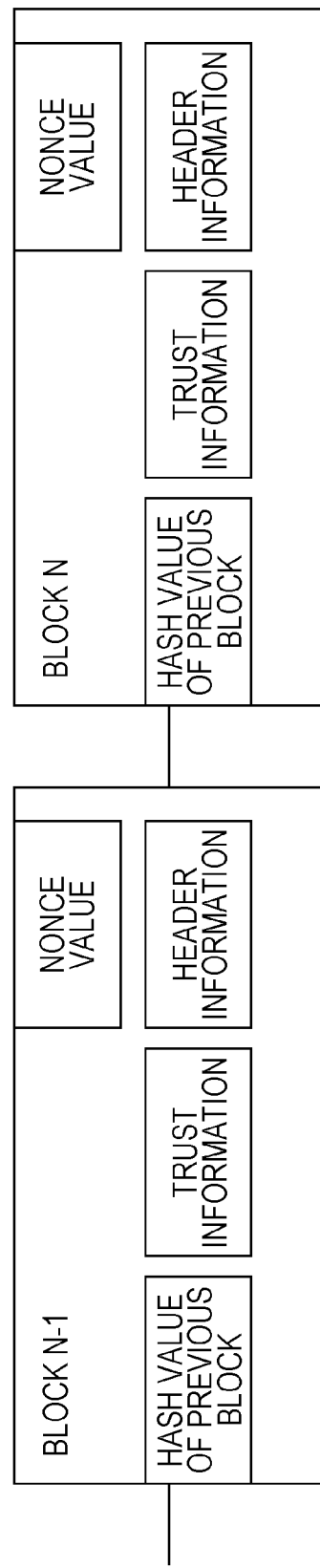
FIG. 17 is a schematic diagram illustrating one example of the data structure of a blockchain.

FIG. 17 is a schematic diagram illustrating one example of the data structure of a blockchain. The blockchain is a chain of blocks having a predetermined data structure. The multiple blocks are chained in a time series. Each block includes information to be managed, a hash value indicating the information in a block one or more blocks earlier (previous block), and information (such as a nonce value or a signature) for detecting the presence or absence of falsification.

For example, a block n holds a hash value Hn−1 of a previous block n−1, and a block n+1 holds a hash value Hn of the previous block n. In the exemplary embodiment, the information to be managed is the trust list group illustrated in FIG. 5 and the header information illustrated in FIG. 6. In the case in which some of the trust information and header information is removed, the remaining trust information and header information becomes the information to be managed in the next block.

The multiple computation nodes in the computation node group function as management units that share and manage the blockchain. Each of the multiple computation nodes in the computation node group shares the information of generated blocks and the most recent blockchain with the multiple computation nodes.

To deter tampering and falsification, each of the multiple computation nodes in the computation node group participates in a predetermined consensus algorithm. Through a consensus process following the predetermined consensus algorithm, new blocks are added to the blockchain. For example, a block generated by a computation node that has discovered a nonce value first becomes the block that is ultimately added to the blockchain. Compensation is paid to the computation node that discovers the nonce value.

Each computation node performs the following process, for example.

(1) Each computation node receives information to be managed.
(2) Each computation node generates a block including information based on the previous block and the received information.
(3) Each computation node performs a predetermined consensus process on the block generated by the computation node itself and blocks generated by other computation nodes, and then adds a new block to the blockchain that the computation node itself is managing.
(4) Each computation node exchanges information with other computation nodes. Information such as the block generated by the computation node itself and blocks generated by other computation nodes is transmitted to other computation nodes.
(5) Each computation node stores a copy of the blockchain.
(6) Each computation node verifies the information inside a block to add when adding a block to the blockchain held by the computation node itself.
(7) In response to a request from another computation node, each computation node outputs information about the blockchain held by the computation node itself.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A communication device comprising:
a transmission unit that transmits a packet group including a plurality of packets, wherein each of the packets in the packet group transmitted in one communication session contains a header; and
a processing unit that, in a case in which the communication device itself is not trusted by a destination communication device to which to transmit the packet group, performs a process of instructing each of a plurality of nodes of a management unit that registers a trust list stored in the storage unit of the communication device itself as the management information and manages the management information distributed among the plurality of nodes to register header information as the management information, the header information being partial information of the header included in each packet of the packet group transmitted by the transmission unit, and in a case in which the trust list stored in the storage unit of the communication device itself is modified, the processing unit further performs a process of instructing each of the plurality of nodes of the management unit to update the trust list of the management information according to the modified trust list.

2. The communication device according to claim 1, wherein
the case in which the communication device itself is not trusted by a destination communication device to which to transmit the packet group is a case in which trust information indicating that the communication device itself trusts the source communication device is not recorded in the trust list held by a majority of nodes among the plurality of nodes of the management unit, or a case in which a period of validity of the recorded trust information is expired.

3. A communication system comprising:
a plurality of the communication devices according to claim 1; and
the management unit that registers and manages management information distributed among the plurality of nodes.

4. A non-transitory computer readable medium storing a program causing a computer to execute a process for functioning as the communication device according to claim 1.

* * * * *